United States Patent
Hiyama

(10) Patent No.: US 8,670,228 B2
(45) Date of Patent: Mar. 11, 2014

(54) MOUNTING ADAPTER AND INFORMATION PROCESSING APPARATUS

(75) Inventor: Kenichi Hiyama, Sagamihara (JP)

(73) Assignee: Ricoh Company, Ltd., Tokyo (JP)

( * ) Notice: Subject to any disclaimer, the term of this patent is extended or adjusted under 35 U.S.C. 154(b) by 593 days.

(21) Appl. No.: 12/901,747

(22) Filed: Oct. 11, 2010

(65) Prior Publication Data

US 2011/0090637 A1    Apr. 21, 2011

(30) Foreign Application Priority Data

Oct. 16, 2009   (JP) ................................. 2009-239002

(51) Int. Cl.
*H05K 5/00*   (2006.01)
*H05K 7/00*   (2006.01)
*G06F 1/16*   (2006.01)

(52) U.S. Cl.
USPC ............ 361/679.33; 361/679.37; 361/679.39; 361/679.31; 361/752; 361/756

(58) Field of Classification Search
USPC ............. 361/679.33, 679.37, 679.39, 679.31, 361/752, 756
See application file for complete search history.

(56) References Cited

U.S. PATENT DOCUMENTS 6,442,022 B1 *  8/2002  Paul .......................... 361/679.33
6,976,974 B2 * 12/2005  Houde et al. .................... 604/32
7,209,346 B2 *  4/2007  Fujimoto et al. .......... 361/679.33
7,548,418 B2 *  6/2009  Martin et al. ............. 361/679.37
2005/0177683 A1 * 8/2005 Isobe et al. .................... 711/114

FOREIGN PATENT DOCUMENTS

| JP | 8-31509 | 2/1996 |
| JP | 2001-287132 | 10/2001 |
| JP | 2004-055285 | 2/2004 |
| JP | 3518731 | 2/2004 |
| JP | 2009-064664 | 3/2009 |

OTHER PUBLICATIONS

Office Action issued Oct. 4, 2013 in Japanese patent application No. 2009-239002.

* cited by examiner

*Primary Examiner* — Anthony Haughton
(74) *Attorney, Agent, or Firm* — Oblon, Spivak, McClelland, Maier & Neustadt, L.L.P.

(57) ABSTRACT

A mounting adapter capable of reducing manufacturing cost includes: an HDD tray to which a hard disk drive is fixed; an HDD holder fixed to a housing and receiving the HDD tray inserted from a Y-axis direction; and a connector board so mounted to the holder as to be movable in a plane perpendicular to the Y-axis direction, and provided with a connector with which an HDD connector is connected. The suitable mounting adapter enables the HDD connector and the connector of the connector board to be engaged optimally even though the central axes of the HDD connector and the connector of the connector board are not aligned.

7 Claims, 24 Drawing Sheets

SCREW HOLE

FIG. 15
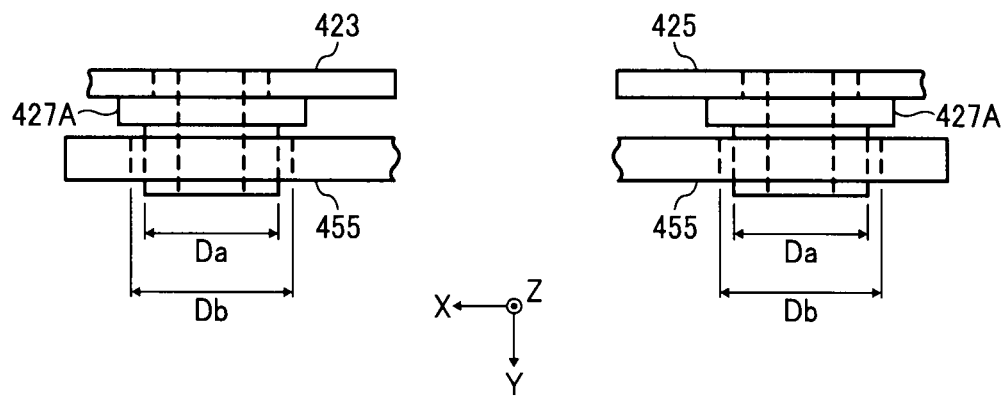
FIG. 16A      FIG. 16B
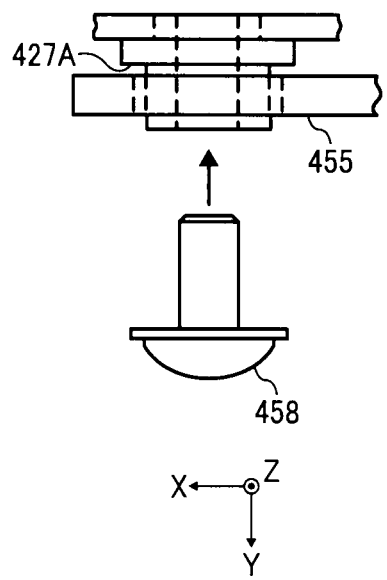
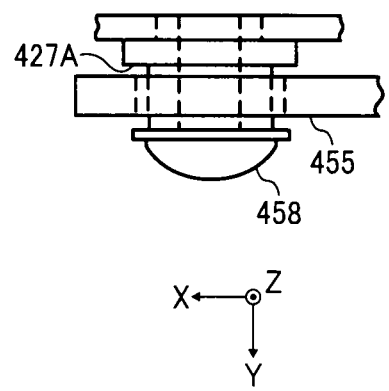

OBLONG HOLE  ROUND HOLE

ROUND HOLE  OBLONG HOLE

OBLONG HOLE  ROUND HOLE 425A  425   423A  423

HELD BY A RAISED PORTION

HELD BY A COUNTERSINK

MOUNTING ADAPTER AND INFORMATION PROCESSING APPARATUS

CROSS-REFERENCE TO RELATED APPLICATIONS

The present application claims priority from Japanese patent application number 2009-239002,filed on Oct. 16, 2009, the entire contents of which are hereby incorporated by reference herein.

BACKGROUND OF THE INVENTION

1. Field of the Invention

The present invention relates to a mounting adapter and an information processing apparatus, and more particularly, to a mounting adapter to mount a device including a connector to a housing of the apparatus, and to an information processing apparatus employing such a mounting adapter.

2. Discussion of the Related Art

Hard disks and optical discs have become indispensable as mass information recording media for information processing apparatuses such as computer equipment and controllers. Such information processing apparatuses are in general equipped with a hard disk drive (hereinafter, "HDD") including a hard disk and a driving device to cause the hard disk to read and write data, and an optical disc drive to write and read data to and from a compact disc (CD) or a digital versatile disc (DVD).

As a means to hot-plug an HDD unit to a housing of the information processing apparatus, an HDD holder employing guide rails formed by projection molding using resins or die-cast aluminum has been commercialized.

Similarly, as a device for positioning the HDD unit when inserting the HDD unit into the housing, a technique is known in which round holes as main reference holes and oblong secondary slots are provided to an HDD tray and two tapered guide pins are provided to an HDD holder for the tray.

JP-H08-31509-A discloses a connector guide system to attach a connector of a hard disk unit to a connector of the apparatus side. This connector guide system electrically connects a first connector attached to the housing and a second connector attached to a leading edge of the cable by engaging the two connectors, and includes a connector holder to hold the second connector, a bracket slidably provided at a contact surface with the connector holder, a guide pin provided to the connector holder to guide the second connector to the attachment position of the first connector, and a guide groove, arranged to the housing, to which the guide pin is inserted.

Similarly, JP-2001-287132-A discloses a positioning device to enable positioning by inserting a pin to a reference hole, for the purpose of positioning with a high precision in a short period of time with a simple structure. This positioning device includes the reference hole configured such that an edge of the hole at a side where the pin enters is chamfered approximately by 45 degrees and the angle of the leading edge of the pin is tapered approximately by 45 degrees. The reference hole and the pin are relatively position-adjusted until the opening edge of the reference hole abuts the edge line of the projection at a leading edge of the pin.

In addition, Japanese Patent 3518731 discloses a photo processing device including a digital exposure means to perform scanning and exposure of the photoconductive material and a conveyance means, provided in the vicinity of the digital exposure means, to perform conveyance processing relative to the photoconductive material. In this photo processing device, the conveyance means includes at least one of a tapered pin at a side of the conveyance means and a tapered hole at a side of the conveyance means, and the digital exposure means includes a tapered hole at a side of the exposure means and a tapered pin at aside of the exposure means corresponding to the tapered pin at the side of the conveyance means and the tapered hole at the side of conveyance means, respectively. Then, the conveyance means is pressed against the digital exposure means by a pressure applying means, whereby the tapered pin and the tapered hole corresponding to the tapered pin are engaged without any substantial gap therebetween.

However, HDD holders currently commercially available employ many parts and components such as connectors and cables, and therefore are not obtainable at low cost.

For these reasons, a need exists for a mounting adapter obtainable at low cost and an information processing apparatus manufactured at low cost.

SUMMARY OF THE INVENTION

Accordingly, the present invention provides a novel mounting adapter to mount a device including a connector to a housing, which includes a tray to which the device is fixedly mounted, a holder, fixed to the housing, to which the tray is inserted from a first direction, and a connector board mounted with a connector to be connected to the connector of the device. The connector board is so arranged to the holder as to be movable in a plane perpendicular to the first direction. Thus, the number of constituent parts such as connectors and cables can be reduced compared to conventional adapters, and a low-cost product may be obtained.

A second aspect of the present invention is to provide a novel information processing apparatus, including at least one of a hard disk drive and an optical disc drive inside the housing, and the above-described mounting. The hard disk drive and the optical disc drive are mounted to the housing the mounting adapter. Because at least one of the hard disk drive and the optical disc drive is mounted to the housing the mounting adapter of the present invention, as a result, a low-cost product can be obtained.

BRIEF DESCRIPTION OF THE DRAWINGS

FIG. 15 is a view illustrating relative sizes of a through hole of the connector board and the fixed pin;

FIGS. 16A and 16B each are views illustrating mounting of the connector board to the side plate;

DESCRIPTION OF THE PREFERRED EMBODIMENTS

Embodiments of the present invention will now be described with reference to drawings 1 through 30.

Figure 1:
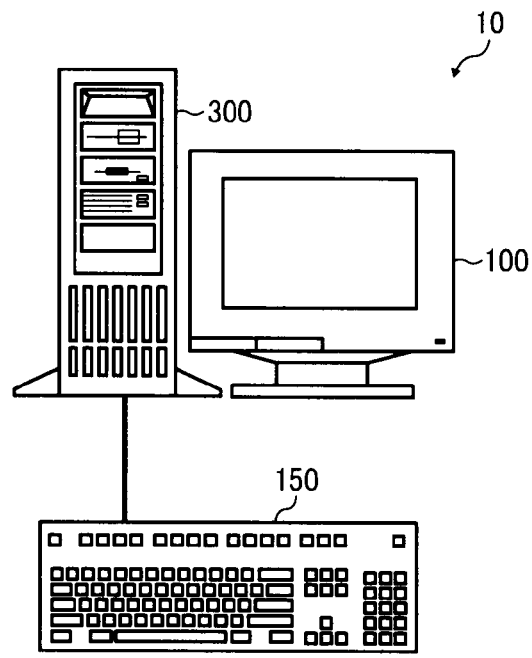
FIG. 1 is a diagram illustrating a general configuration of an information processing apparatus according to an embodiment of the present invention.

FIG. 1 shows an external view of an information processing apparatus 10 according to one embodiment of the present invention.

The information processing apparatus 10 includes a monitor 100, an input device 150, and a mainframe 300.

The monitor 100 includes a liquid crystal display (LCD) as a display device, which displays various information according to instructions from the mainframe 300. The liquid crystal display may be replaced by a CRT or a plasma display panel (PDP).

The input device 150 includes a keyboard as an input device, and transmits various information input by an operator to the mainframe 300. With or without a keyboard, at least one of a mouse, a tablet, a light pen and a touch panel may be provided. The information from the input device may be input wirelessly.

The monitor 100 and the input device 150 may be integrally formed similarly to the case of an LCD with a touch panel.

The mainframe 300 includes a mother board, a power supply unit, a hard disk drive, a cooling fan, and the like, and the devices are incorporated in the so-called tower configuration housing.

On a front or rear panel of the housing, there are provided a graphics port to which the monitor 100 is connected, a keyboard connector to which the keyboard is connected, a plurality of USB connectors, a microphone terminal, a headphone terminal, a serial port, a parallel port, a LAN connector, and the like.

Figure 2:
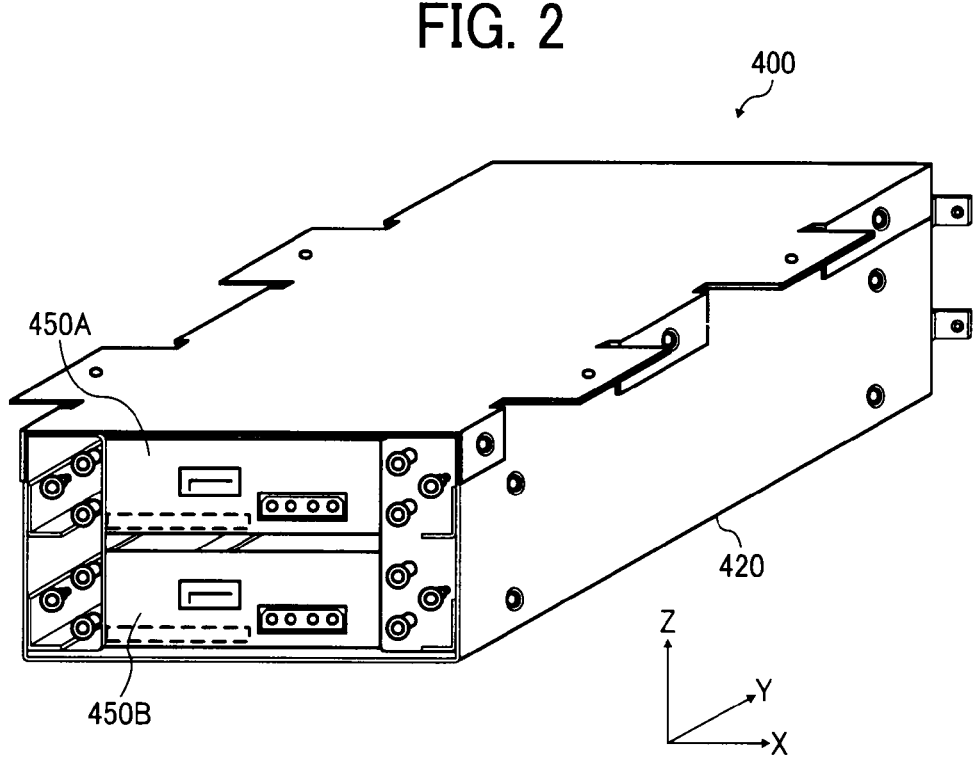
FIG. 2 is a diagram illustrating an external view of an HDD mounting adapter.

The hard disk drive is, as illustrated in FIG. 2, connected to the housing via an HDD mounting adapter 400.

In the illustrated example, the HDD mounting adapter 400 has a two-stage structure, in which each stage may incorporate a hard disk drive, respectively. Specifically, the HDD mounting adapter 400 may incorporate two hard disk drives. In addition, each hard disk drive is detachably attached to the housing from a front side thereof, with a front panel of the housing detached.

In the present specification, the piling direction of the two hard disk drives is set to be as a Z-axis direction, and the attachment and detachment direction of the hard disk drive is set to be as a Y-axis direction in the XYZ three-dimensional perpendicular coordinate axes.

The HDD-mounting adapter 400 includes two HDD trays 410A and 410B, not illustrated in FIG. 2, an HDD holder 420, and two connector boards 450A and 450B.

The HDD tray 410A is a plate member to fix a hard disk drive to be installed at an upper stage (i.e., stage in the +Z side) and the HDD tray 410B is a plate member to fix a hard disk drive to be installed at a lower stage (i.e., stage in the −Z side).

Both the HDD trays 410A and 410B are plate members of identical shape, formed by machining sheet metal. If there is no need to discriminate the HDD tray 410A from the HDD tray 410B, these trays are generally called "HDD tray 410".

Figure 3:
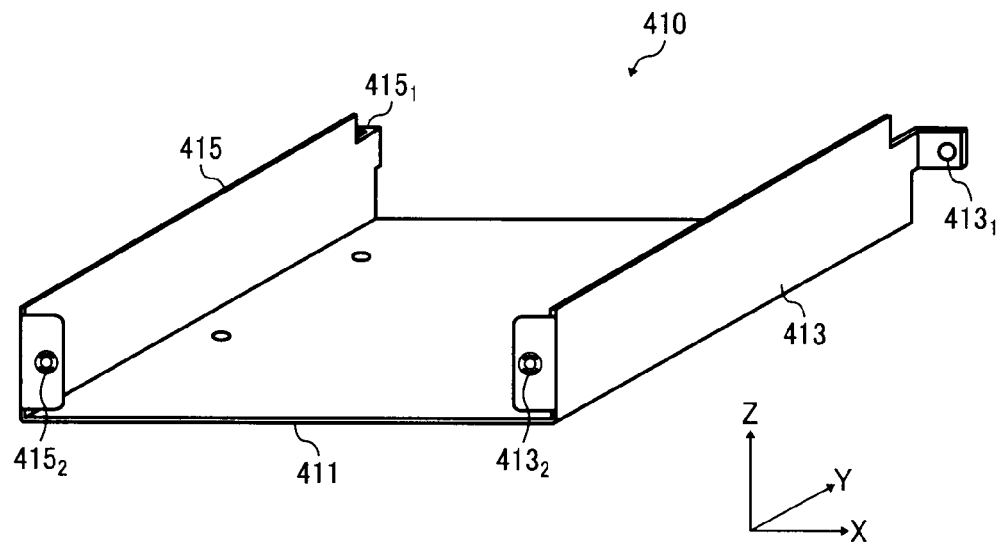
FIG. 3 is a view illustrating an HDD tray.

As illustrated in FIG. 3, the HDD tray 410 includes a bottom plate 411 parallel to the X-Y plane, a side plate 413 extending in the +Z direction from the +X side edge of the bottom plate 411, and a side plate 415 extending in the +Z direction from the −X side edge of the bottom plate 411.

The bottom plate 411 includes four through holes to screw the hard disk drive to the bottom plate 411.

The +X side edge of the side plate 413 is partially bent by 90 degrees toward +X side, and is provided with a through hole $413_1$ to screw the side plate 413 to the HDD holder 420.

The −Y side edge of the side plate 413 is partially bent by 90 degrees toward −X side, and is provided with a countersink 413$_2$. Similarly, the −Y side edge of the side plate 415 is partially bent by 90 degrees toward +X side and is provided with a countersink 415$_2$.

Figure 4A:
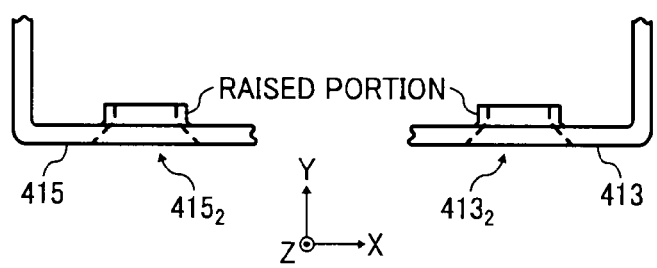
FIGS. 4A and 4B each are views illustrating a countersink.
Figure 4B:
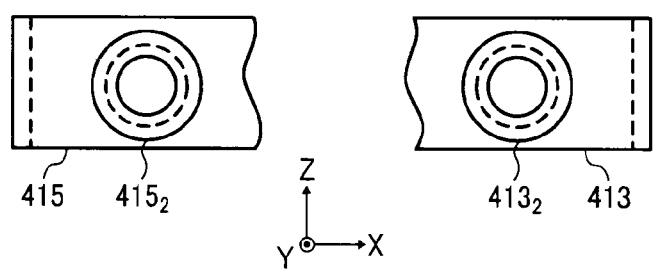

Each of the countersinks 413$_2$ and 415$_2$ is formed to have a saucer shape at −Y side and a raised portion at +Y side as illustrated in FIGS. 4A and 4B as examples. In the exemplary embodiment, each side plate is formed to be 1 mm thick and the raised amount of each countersink is 1 mm thick.

Figure 5:
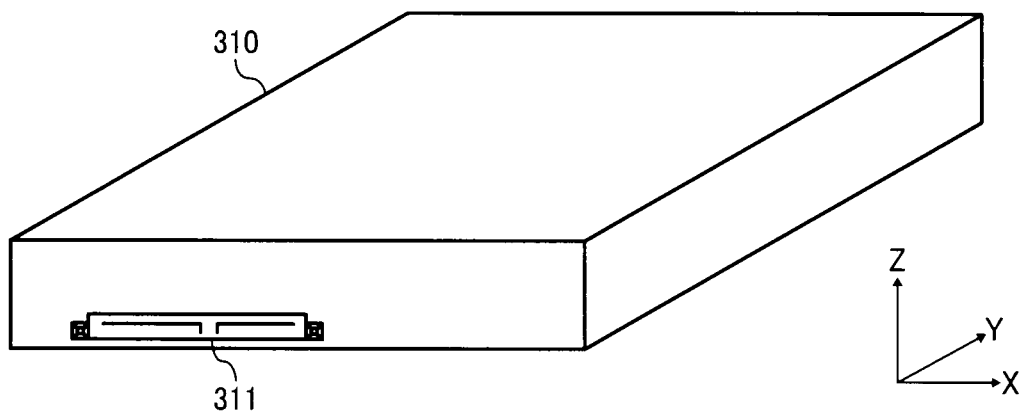
FIG. 5 is a view illustrating a hard disk drive.
Figure 6:
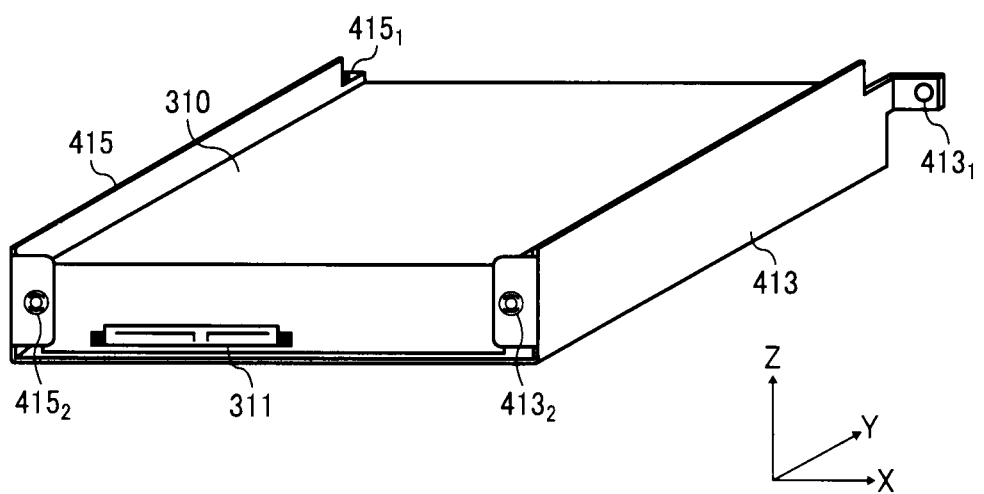
FIG. 6 is a view illustrating an HDD tray to which a hard disk drive is fixed.

As illustrated in FIG. 5, the hard disk drive 310 includes a connector 311 or an HDD connector 311 to which a signal cable and/or a power supply cable are connected. As illustrated in FIG. 6, the hard disk drive 310 is mounted on the bottom plate 411 with the side provided with the HDD connector 311 positioned at the −Y side, and is fixed to the HDD tray 410 using four screws.

The HDD holder 420 receives the HDD trays 410A and 410B, respectively, along the Y-axis direction from the +Y side, is a plate member fixed to the housing, and is formed by machining sheet metal.

Figure 7:
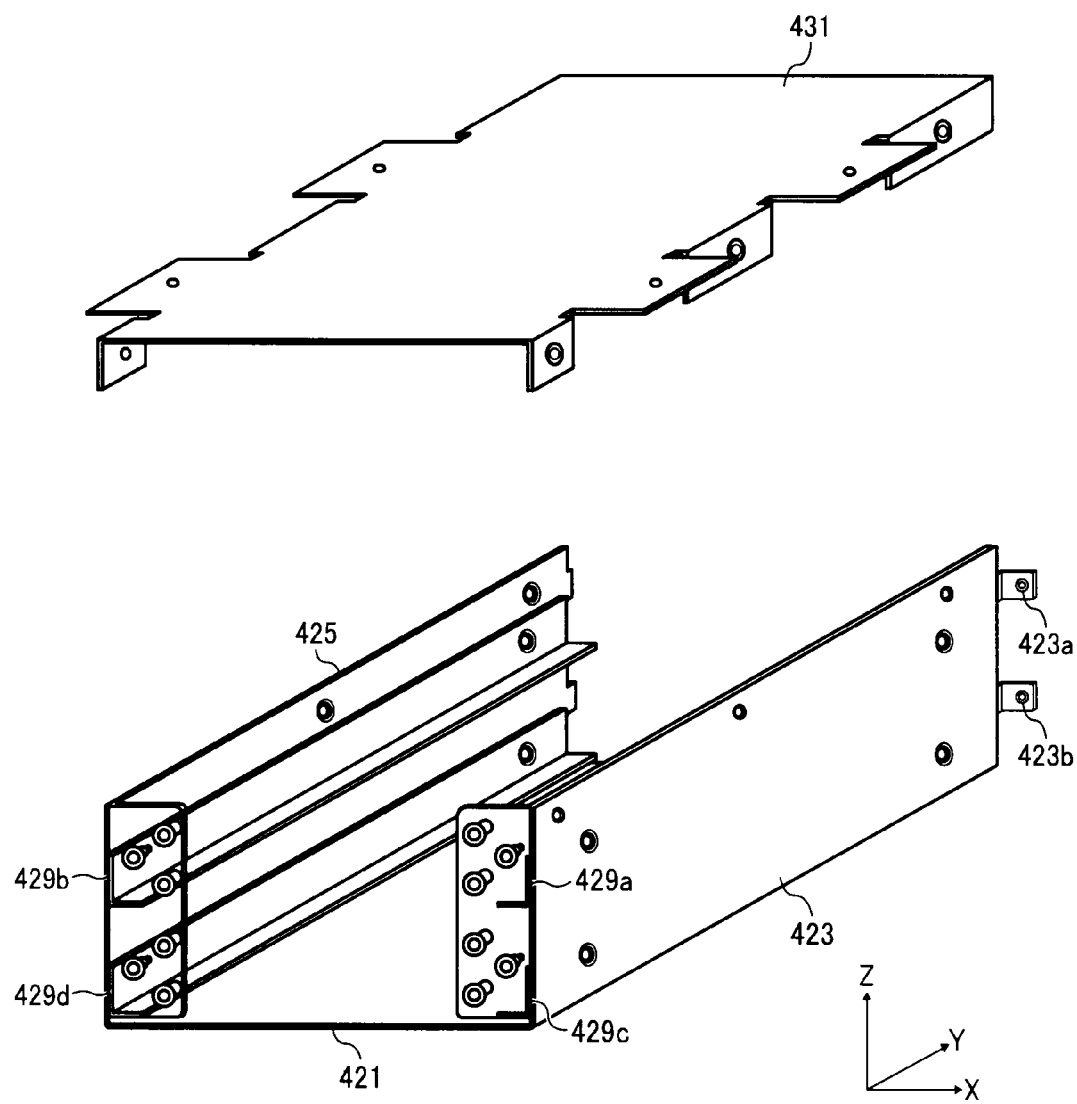
FIG. 7 is a view illustrating a structure of an HDD holder.

As illustrated in FIG. 7, the HDD holder 420 includes a bottom plate 421 parallel to the X-Y plane, a side plate 423 extending in the +Z direction from the +X side edge of the bottom plate 421, a side plate 425 extending in the +Z direction from the −X side edge of the bottom plate 421, a top plate 431, and four guide rails 429a, 429b, 429c, and 429d.

The top plate 431 is a plate member having a plane parallel to the X-Y plane. Both edges of the top plate 431 in the X-axis direction are partially bent by 90 degrees in the −Z direction, which are provided with six countersinks to be fastened with rivets to side plates 423 and 425. The top plate 431 is provided with four through holes to be screwed to the housing.

Each side plate of the top plate 431 includes three countersinks to be fastened with rivets.

The side plate 423 includes four countersinks to fasten with rivets guide rails 429a and 429c. Similarly, the side plate 425 includes four countersinks to fasten with rivets guide rails 429b and 429d.

The +Y side edge of the side plate 423 is partially bent by 90 degrees toward the +X side, and is provided with a screw hole 423a screwed together via the through hole 413$_1$ of the HDD tray 410A and a screw hole 423b screwed together via the through hole 413$_1$ of the HDD tray 410B.

Similarly, the +Y side edge of the side plate 425 is partially bent by 90 degrees toward the −X side, and is provided with a screw hole 425a screwed together via the through hole 415$_1$ of the HDD tray 410A, not shown in FIG. 7, and a screw hole 425b screwed together via the through hole 415$_1$ of the HDD tray 410B, not shown in FIG. 7.

Figure 8:
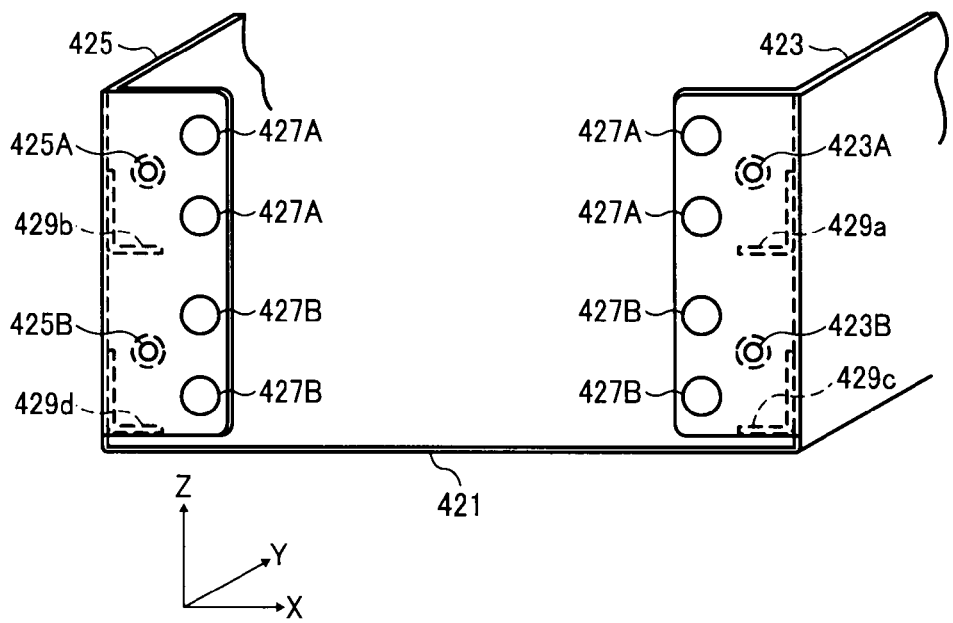
FIG. 8 is an enlarged view of a part of the HDD holder in FIG. 7.

As illustrated in FIG. 8, the −Y side edge of the side plate 423 is bent by 90 degrees in the −X direction, and is provided with a guide pin 423A, a guide pin 423B, two fixed pins 427A, and two fixed pins 427B. The guide pin 423a corresponds to the countersink 413$_2$ of the HDD tray 410A. The guide pin 423B corresponds to the countersink 413$_2$ of the HDD tray 410B. The fixed pins 427A each are screwed together to mount the connector board 450A. The fixed pins 427B each are screwed together to mount the connector board 450B.

Similarly, the −Y side edge of the side plate 425 is bent by 90 degrees in the +X direction, and is provided with a guide pin 425A corresponding to the countersink 415$_2$ of the HDD tray 410A, a guide pin 425B corresponding to the countersink 415$_2$ of the HDD tray 410B, two fixed pins 427A screwed together to mount the connector board 450A, and two fixed pins 427B screwed together to mount the connector board 450B.

Figure 9A:
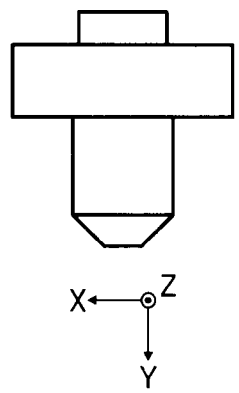
FIGS. 9A and 9B each are views illustrating a guide pin.
Figure 9B:
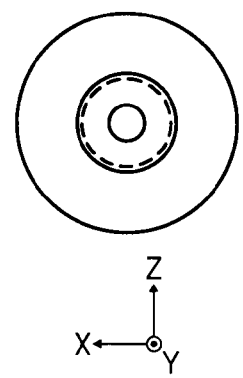
Figure 10A:
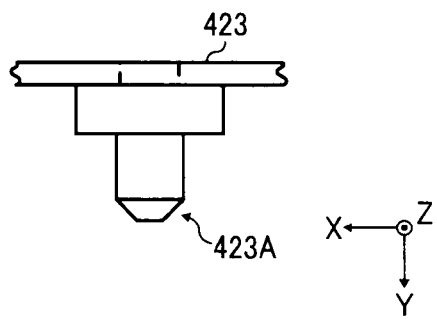
FIG. 10 is a view illustrating a guide pin which is fixed to a side plate.
Figure 10B:
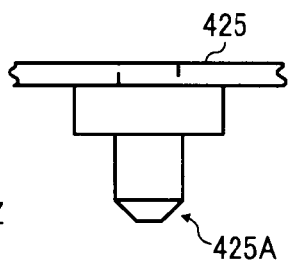

Each guide pin has a similar shape as a pin, and, as illustrated in FIGS. 9A and 9B, has a tapered leading edge (i.e., +Y side edge). Also, as illustrated in FIG. 10, the −Y side edge of the guide pin is embedded in the predetermined position of the side plate and fixed.

Figure 11A:
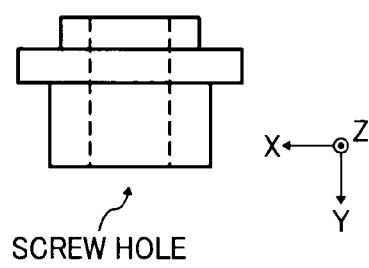
FIGS. 11A and 11B each are views illustrating a fixed pin.
Figure 11B:
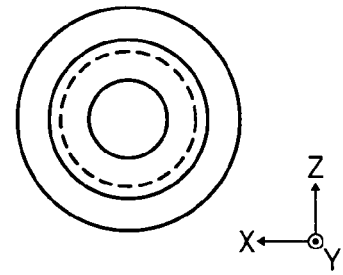
Figure 12A:
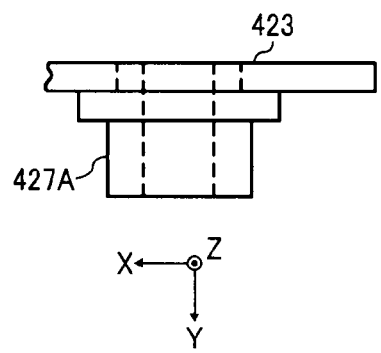
FIGS. 12A and 12B each are views illustrating a fixed pin fixed to the side plate.
Figure 12B:
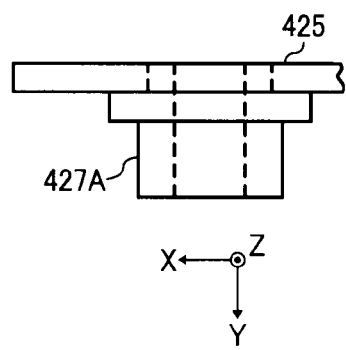

Each fixed pin has a similar shape as a pin, and as illustrated in FIGS. 11A and 11B, has a screw hole in the center thereof. Also, as illustrated in FIGS. 12A and 12B, the −Y side edge of each fixed pin is embedded in the predetermined position of the side plate and fixed.

Figure 13:
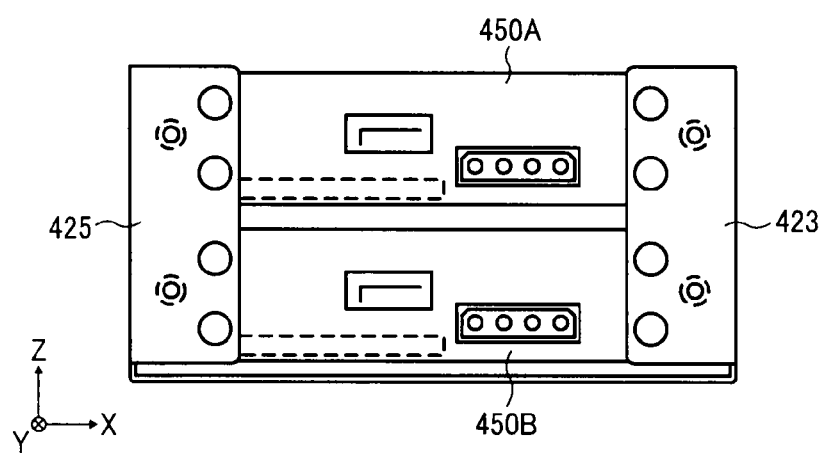
FIG. 13 is a view illustrating two connector boards.

As illustrated in FIG. 13, the connector board 450A is for the hard disk drive to be mounted in the upper stage of the HDD holder 420, and the connector board 450B is for the hard disk drive to be mounted in the lower stage of the HDD holder 420.

Both the connector boards 450A and 450B have the same shape and configuration, hereinafter referred to collectively as "connector board 450".

Figure 14A:
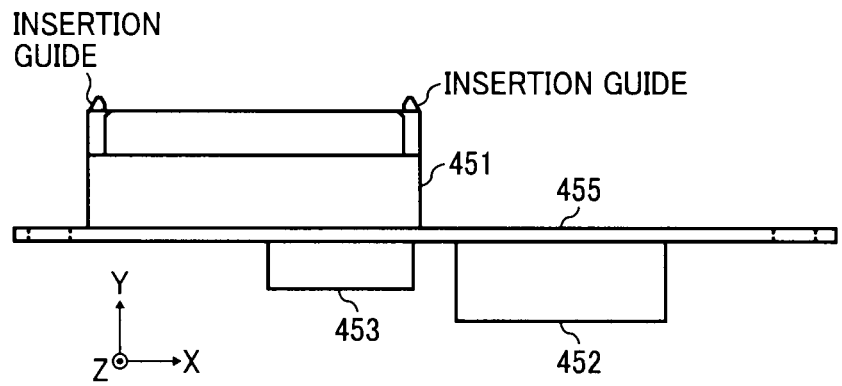
FIGS. 14A through 14C each are views illustrating a structure of the connector board.
Figure 14B:
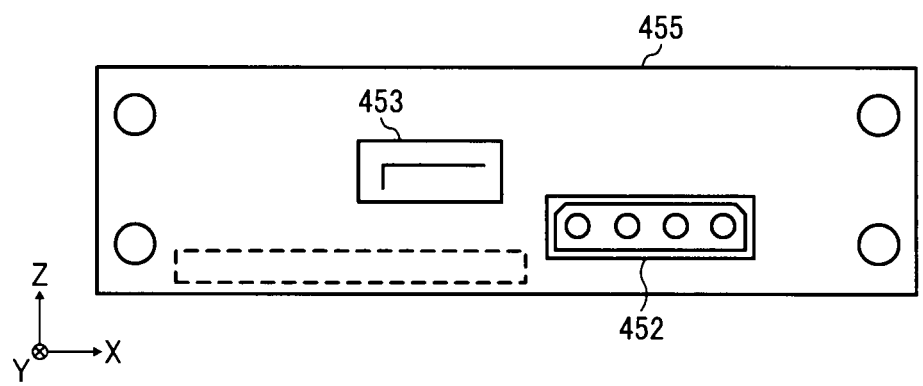
Figure 14C:
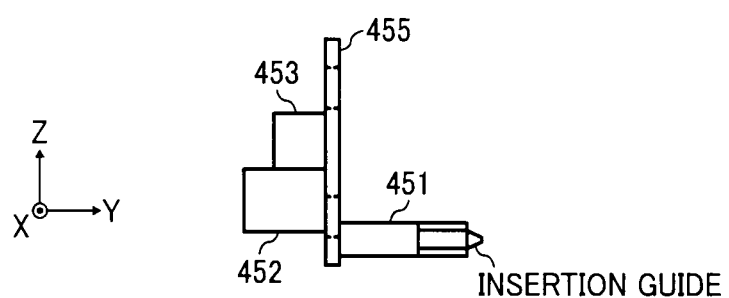

As illustrated in FIGS. 14A to 14C, the connector board 450 includes a rectangular-shaped circuit board 455 with a lengthwise direction in the X-axis direction and a widthwise direction in the Z-axis direction, and is provided with through holes at four corners of the circuit board 455. The circuit board 455 is provided with, on the +Y side plane, a connector 451 to which the HDD connector 311 is connected, and on the −Y side plane, a connector 453 to which the signal cable from the motherboard is connected, and a connector 452 to which the power supply cable from the power supply unit is connected.

The connector 451 may use a commercially available connector D with an insertion guide (Product name: 87678-1001, manufactured by MOLEX Co., Ltd.). This insertion guide has a tapered leading edge. The HDD connector 311 includes a hole into which the insertion guide of the connector D is inserted.

As illustrated in FIG. 15 as an example, an inner diameter Db of the through hole of the circuit board 455 is set to be larger than the outer diameter Da of the fixed pin at the +Y side edge. As an example, Db−Da is set to be 1 mm.

As illustrated in FIGS. 16A and 16B, in a state in which the connector board 450 is set such that the fixed pin is inserted to each of the through holes of the circuit board 455, a screw 458 is screwed together in the screw hole of each fixed pin.

Accordingly, the connector board 450 is mounted to the HDD holder 420 so as to be movable in the X-Z plane perpendicular to the Y-axis direction.

Figure 17:
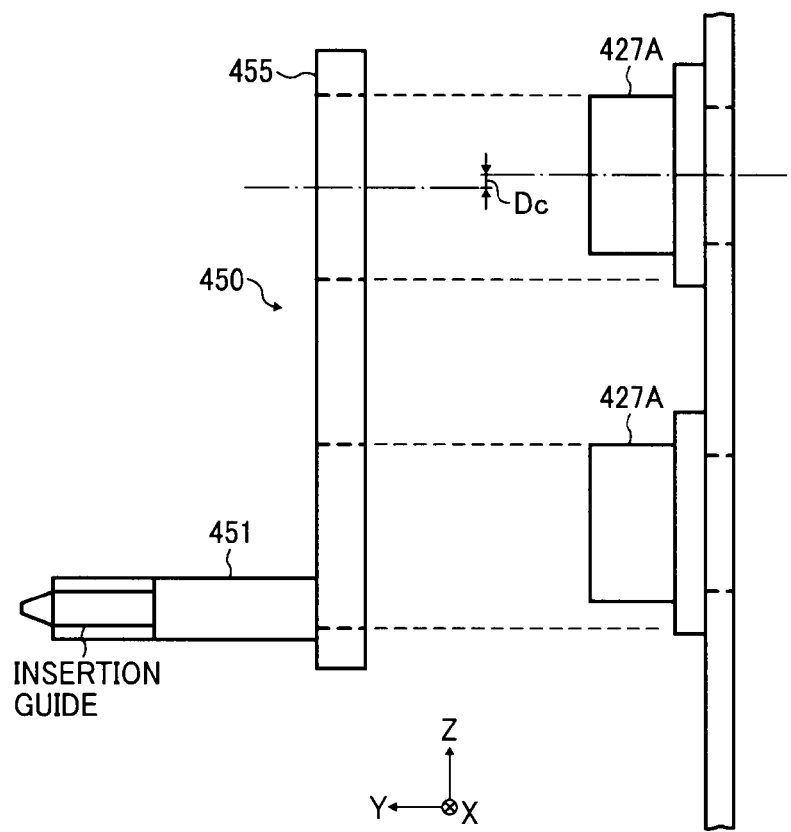
FIG. 17 is a first view illustrating an offset at a position of the fixed pin.

In this case, as illustrated in FIG. 17, because Db>Da, the connector board 450 is stabilized by its own weight in the Z-axis direction such that an upper edge of the thorough hole and an upper edge of the fixed pin contact, and the center line of the through hole positions at the −Z side compared to the center line of the fixed pin.

Figure 18:
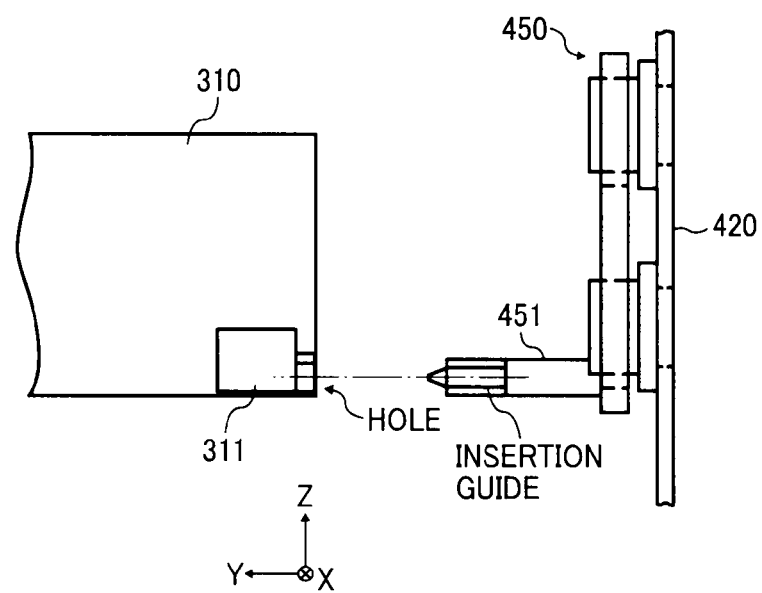
FIG. 18 is a second view illustrating an offset at a position of the fixed pin.

Then, in the present embodiment, as illustrated in FIG. 18, each fixed pin is applied with an offset in the +Z direction so that, with regard to the Z-axis direction, the HDD connector 311 of the hard disk drive 310 and the connector 451 of the connector board 450 are positioned at substantially the same position. Accordingly, the HDD connector 311 and the connector 451 can be easily engaged.

Figure 19A:
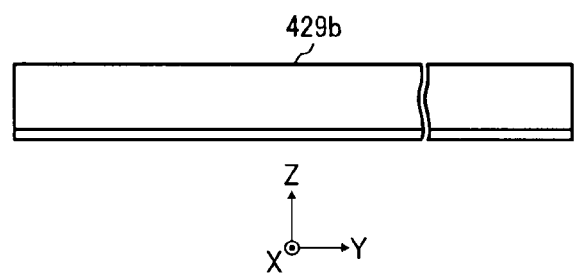
FIGS. 19A and 19B each are views illustrating guide rails.
Figure 19B:
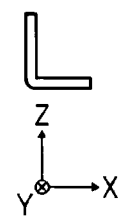

Four guide rails 429a, 429b, 429c, and 429d each are plate members prepared by machining sheet metal having an L-shaped cross-section, with their longitudinal side in the Y-axis direction (see FIGS. 19A and 19B).

Figure 20:
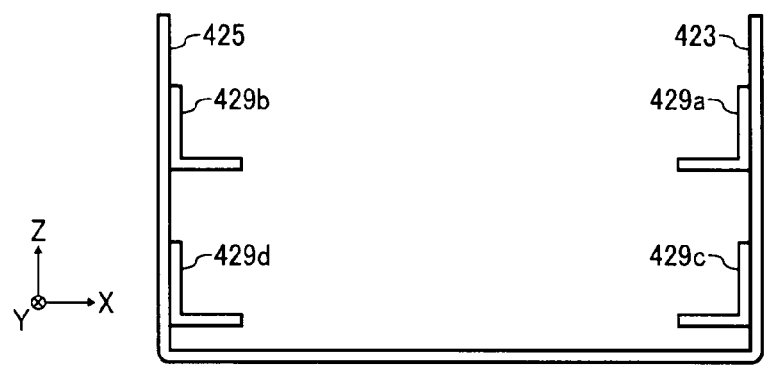
FIG. 20 is a view illustrating relative positions of the four guide rails.

Two guide rails 429a and 429c are fastened by rivets to the −X side surface of the side plate 423. Two guide rails 429b and 429d are fastened by rivets to the +X side surface of the side plate 425 (see FIG. 20).

Figure 21:
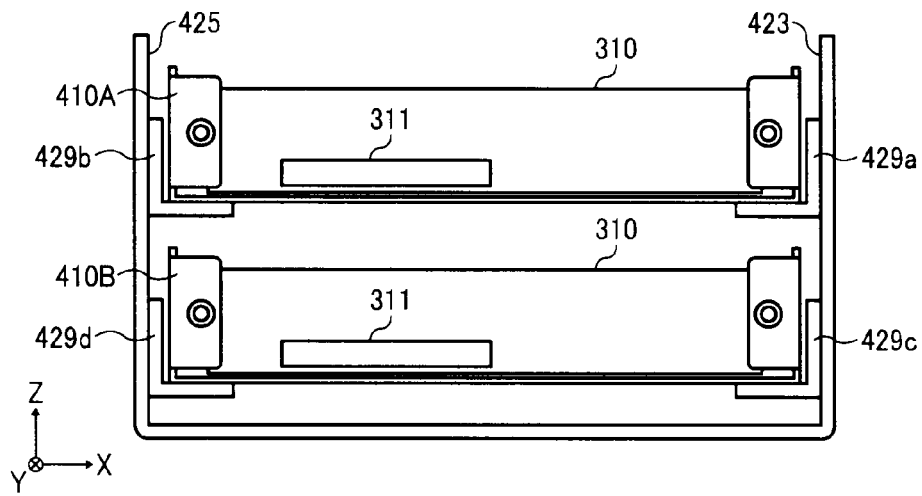
FIG. 21 is a view illustrating relative positions of the four guide rails and the HDD tray.

The guide rail 429a and the guide rail 429b are provided opposite each other in the X-axis direction and serve as guides when the HDD tray 410A is inserted into the upper stage of the HDD holder 420 (see FIG. 21).

The guide rail 429c and the guide rail 429d are provided opposite each other in the X-axis direction and serve as guides when the HDD tray 410B is inserted to the lower stage of the HDD holder 420 (see FIG. 21).

Next, when the hard disk drive 310 is mounted to the upper stage of the HDD holder 420, the relation among the hard disc drive 310, the HDD tray 410A, the connector board 450A, and the guide pin 425A will now be described. It is to be noted that the description assumes that the hard disk drive 310 has already been fixed to the HDD tray 410A.

Figure 22:
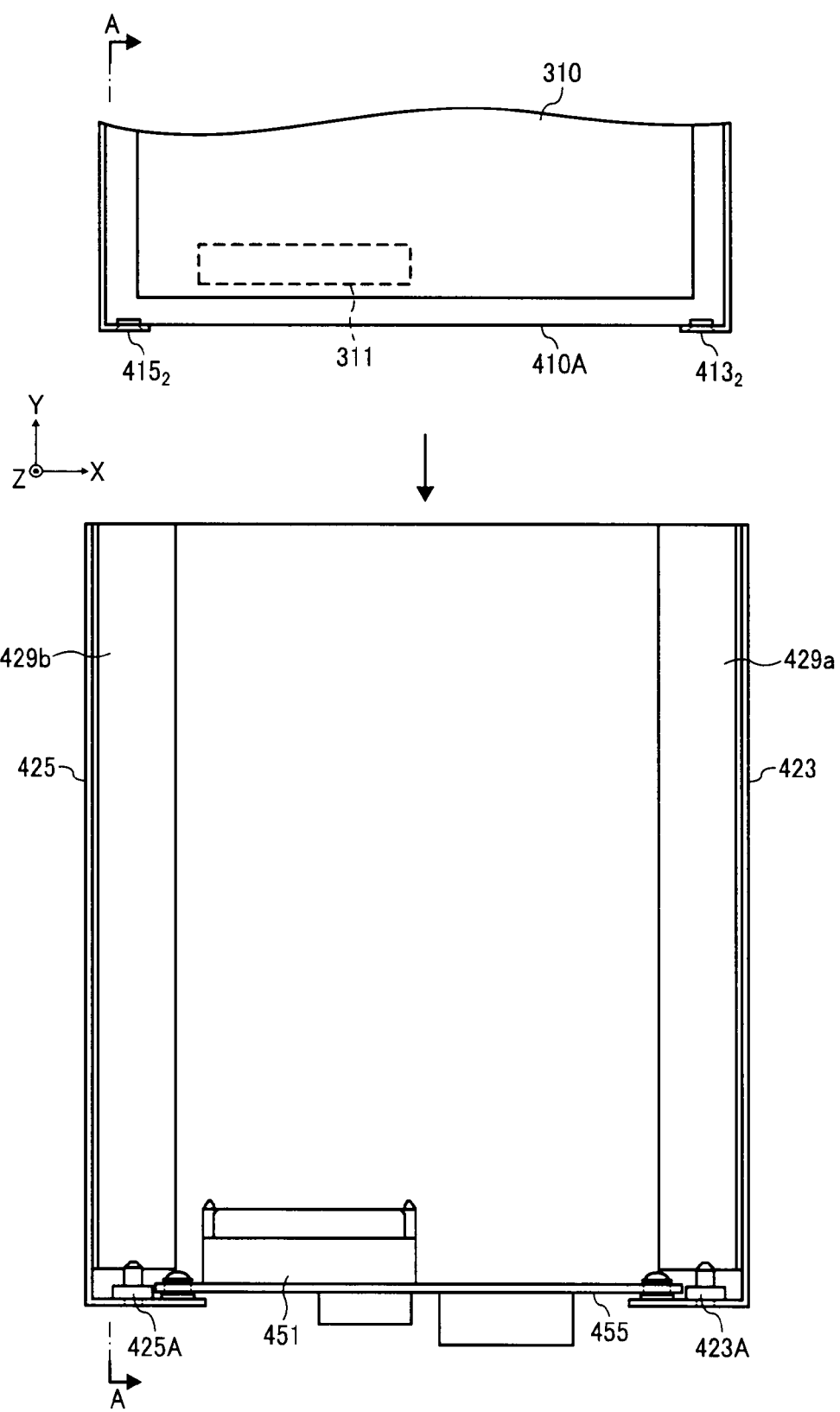
FIG. 22 is a first view illustrating insertion of the HDD tray into the HDD holder.
Figure 23:
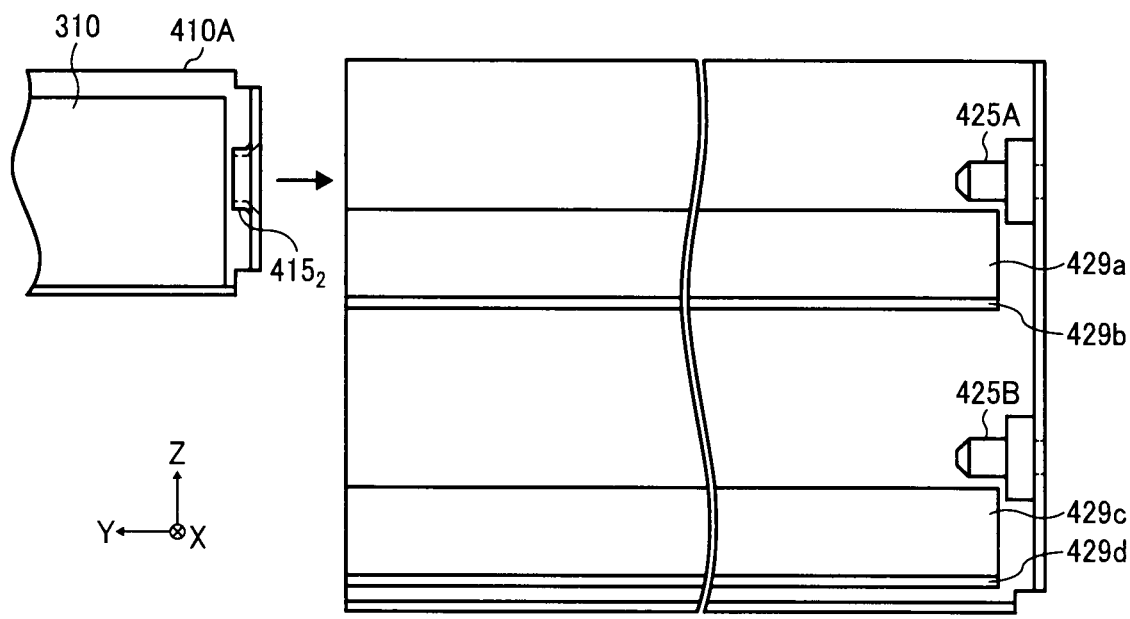
FIG. 23 is a cross sectional view of FIG. 22 along a line A-A.

(1) The HDD tray 410A is brought near the horizontal surface of the +Y side edge of the guide rail 429a and guide rail 429b (see FIGS. 22 and 23). Herein, FIG. 23 is a cross section of FIG. 22 along a line A-A.

(2) The HDD tray 410A is placed on the horizontal surface of the guide rail 429a and the guide rail 429b.

Figure 24:
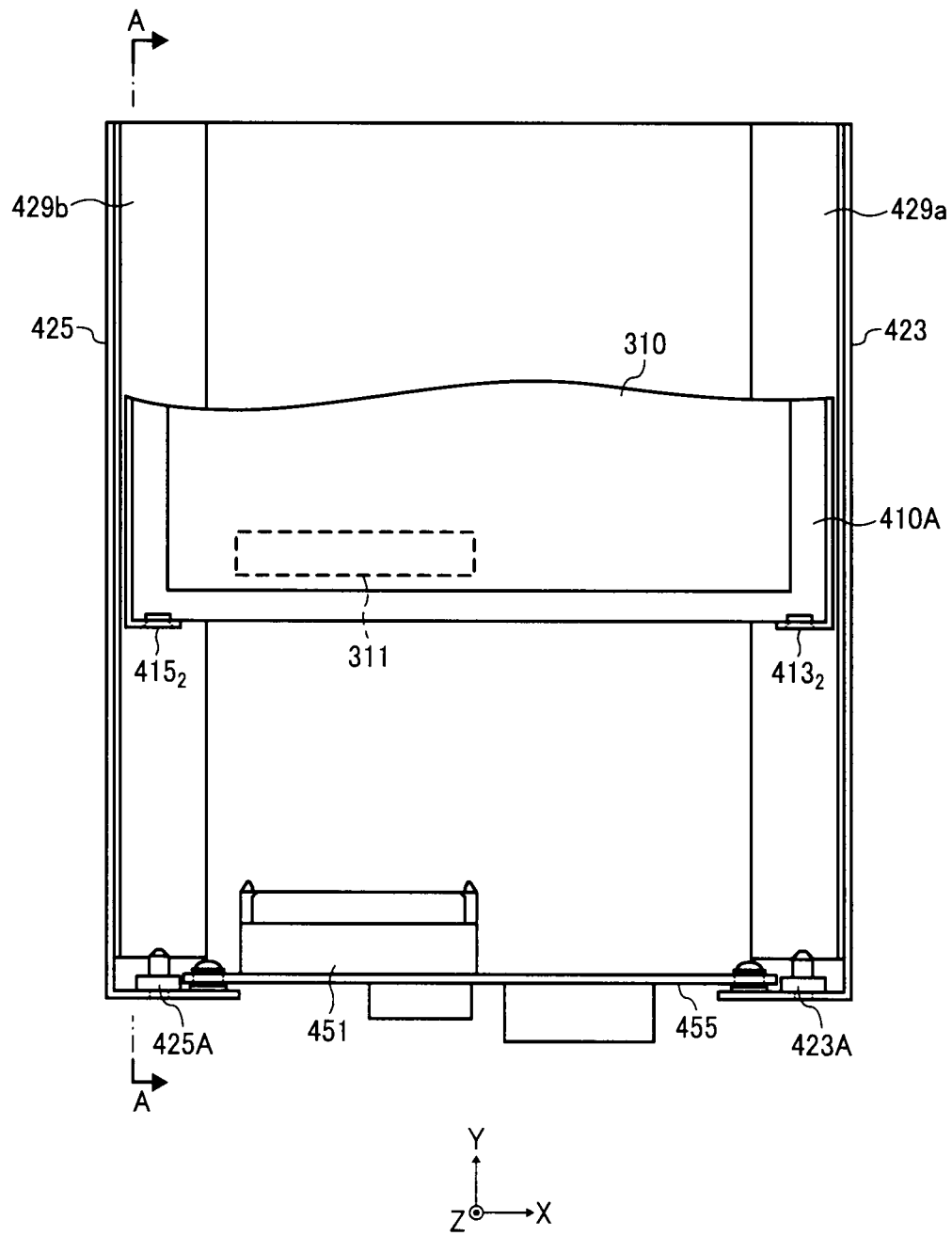
FIG. 24 is a second view illustrating insertion of the HDD tray into the HDD holder.
Figure 25:
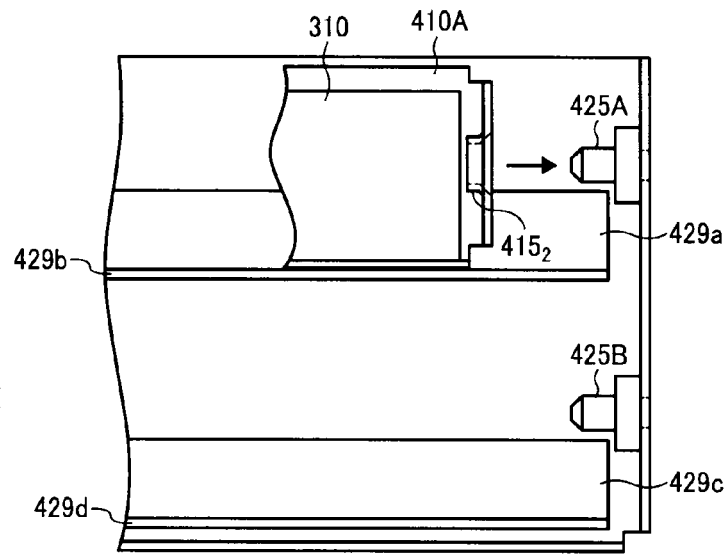
FIG. 25 is a cross sectional view of FIG. 24 along a line A-A.

(3) The HDD tray 410a is moved on the horizontal surface of the guide rail 429a and the guide rail 429b toward the −Y direction (see FIGS. 24 and 25). FIG. 25 is a cross section of FIG. 24 along a line A-A.

Figure 26:
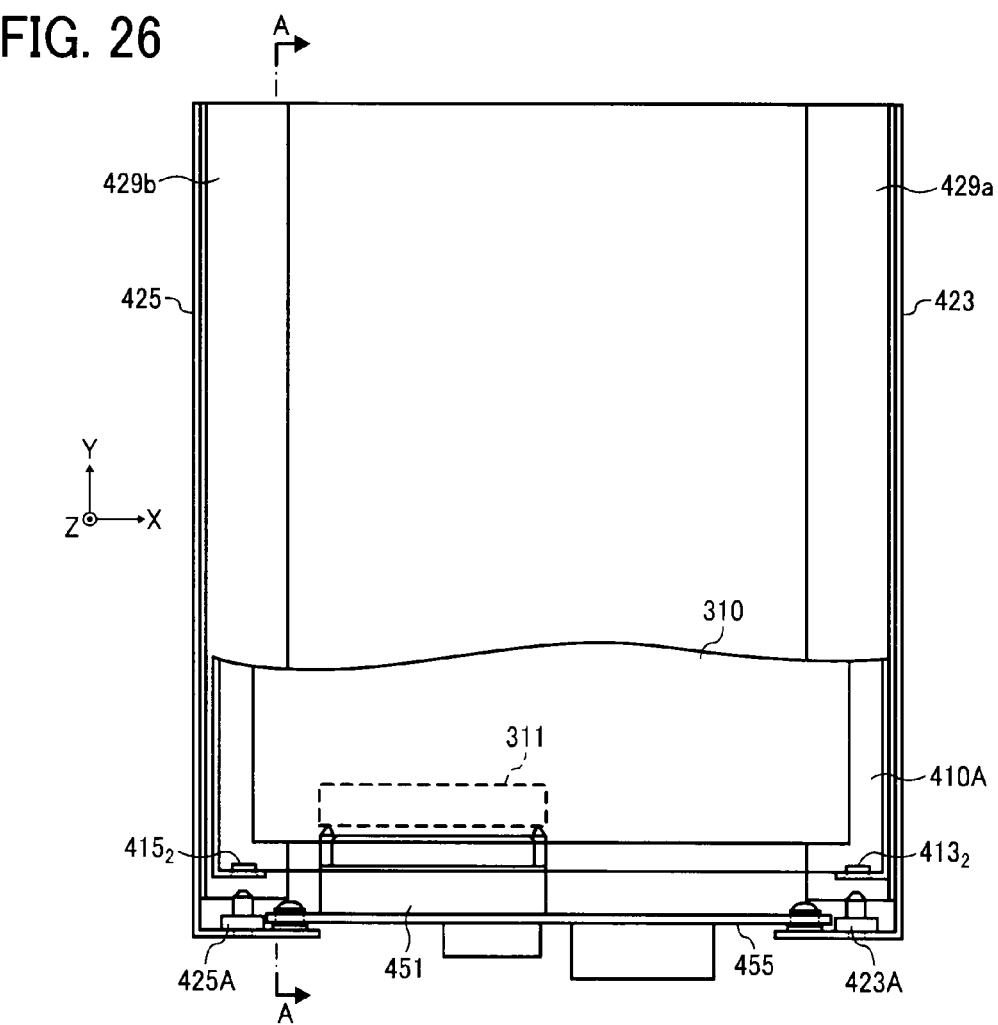
FIG. 26 is a third view illustrating insertion of the HDD tray into the HDD holder.
Figure 27:
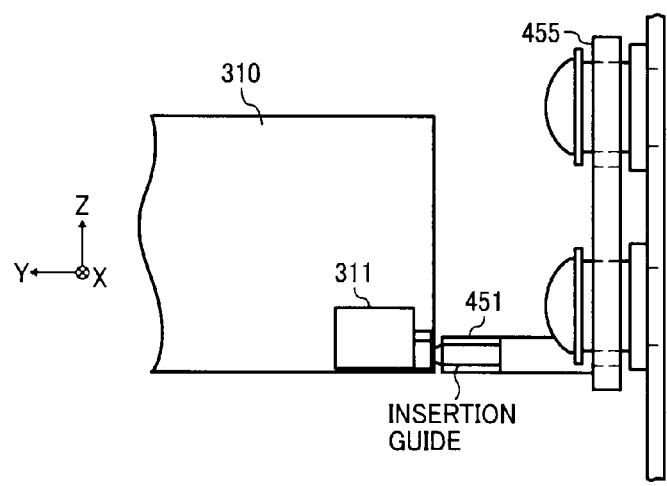
FIG. 27 is a cross sectional view of FIG. 26 along a line A-A.

(4) When the HDD connector 311 is brought in the vicinity of the connector 451, the leading edge of the insertion guide of the connector 451 is inserted into the hole of the HDD connector 311. When the HDD tray 410A is further moved on the horizontal surface of the guide rail 429a and the guide rail 429b toward the −Y direction, the connector board 450A moves inside the X-Z plane so that the central axis of the insertion guide and the central axis of the hole of the HDD connector 311 are coincident. Then, the HDD connector 311 and the connector 451 come to be connected (see FIGS. 26 and 27). FIG. 27 is a cross section of FIG. 26 along a line A-A.

Figure 28:
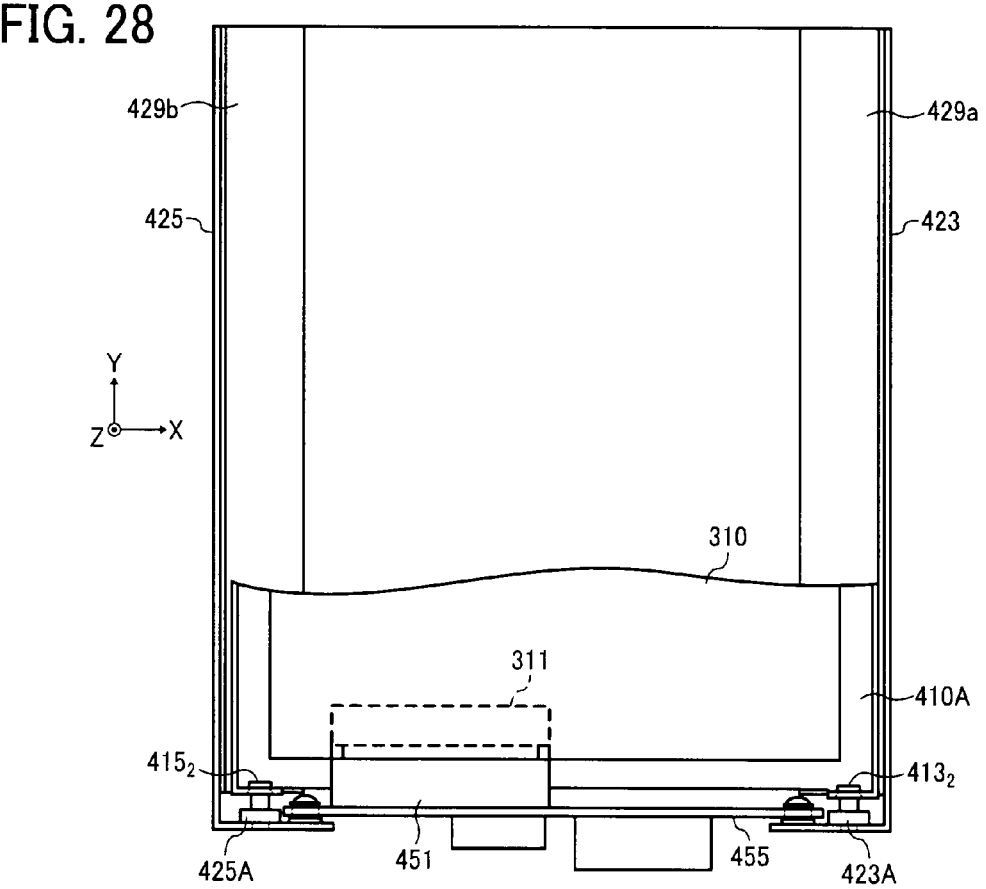
FIG. 28 is a fourth view illustrating insertion of the HDD tray into the HDD holder.
Figure 29A:
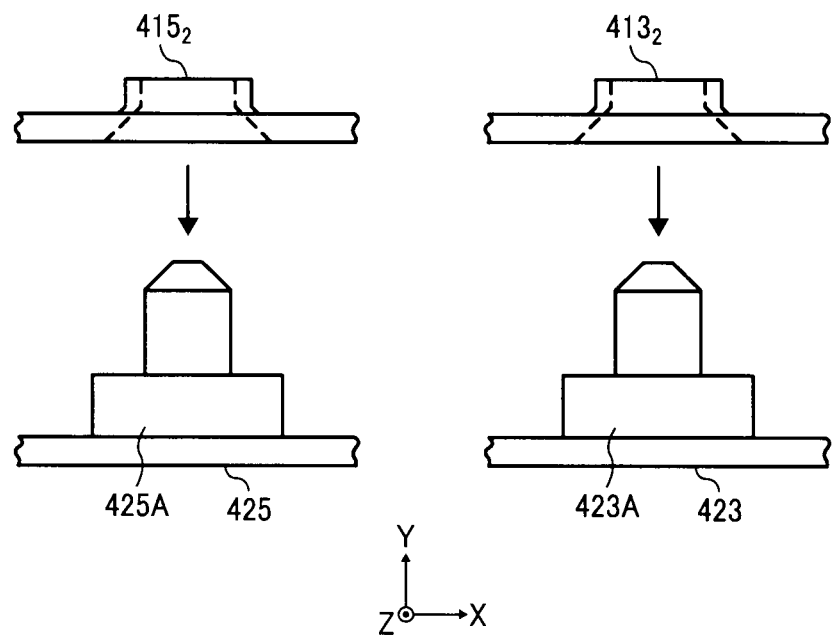
FIGS. 29A and 29B each are views illustrating a relation between the guide pin and the countersink.
Figure 29B:
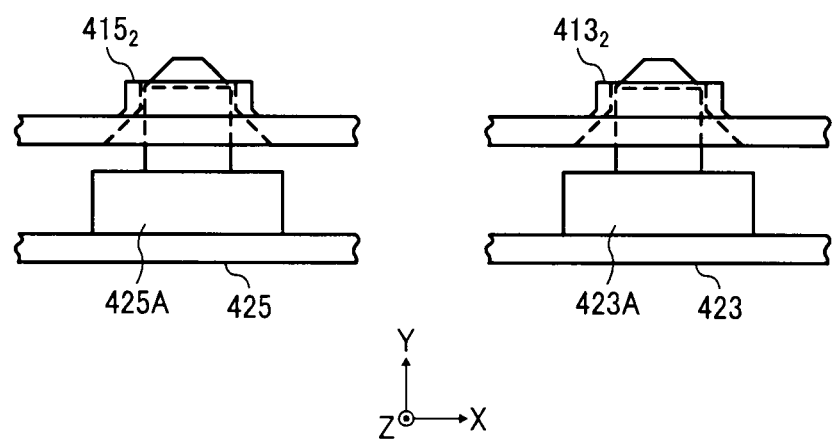

(5) Further, by moving the HDD tray 410A on the horizontal surface of the guide rail 429a and the guide rail 429b toward −Y direction, the HDD connector 311 is further brought to be connected with the connector 451, and the guide pin 423A and the guide pin 425A are inserted to the countersink $413_2$ and the countersink $415_2$, respectively (see FIGS. 28, 29A, and 29B).

Figure 30:
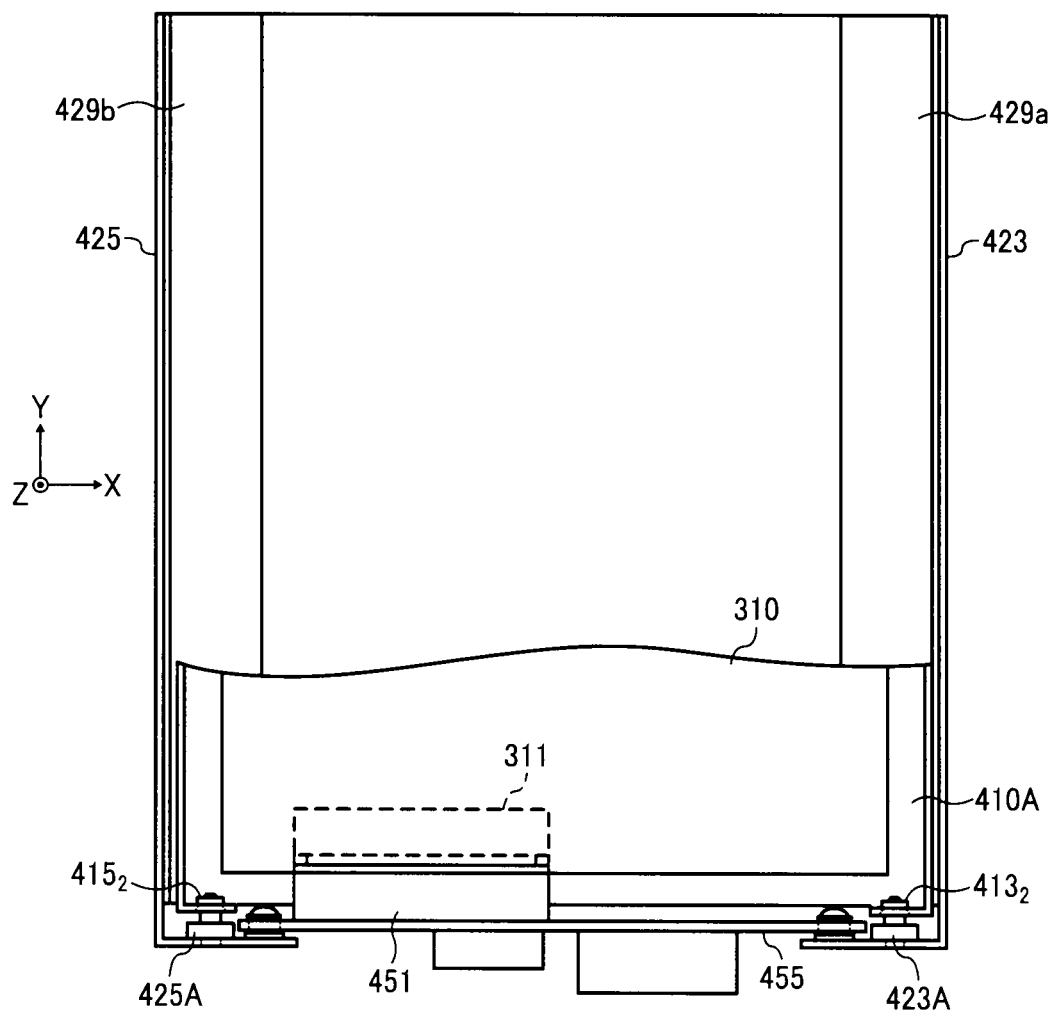
FIG. 30 is a fifth view illustrating insertion of the HDD tray into the HDD holder.

(6) Further, the HDD tray 410A on the horizontal surface of the guide rail 429a and the guide rail 429b are moved in the −Y direction to finally complete the connection between the HDD connector 311 and the connector 451 (see FIG. 30), and fastened with screws to the screw holes 423a and 425a of the HDD holder 420 via the through holes $413_1$ and $415_1$ of the HDD tray 410A. The installation of the hard disk drive 310 to the upper stage of the HDD holder 420 is thus completed.

The removal of the hard disk drive 310 from the HDD holder 420 may be performed by performing above operation in reverse.

As described above, the information processing apparatus 10 includes a hard disk drive, and the hard disk drive is mounted to the housing of the mainframe 300 via the HDD mounting adapter 400.

The HDD mounting adapter 400 includes the HDD tray 410 to which the hard disk drive is fixed, the HDD holder 420 fixed to the housing and to which the HDD tray 410 is inserted from the Y-axis direction, and the connector board 450 provided with the connector which is so mounted to the HDD holder 420 as to be movable within a plane perpendicular to the Y-axis direction and can be connected with the connector of the hard disc drive inserted in the HDD holder 420.

The connector 451 of the connector board 450 has a tapered insertion guide at a leading edge thereof. The HDD connector 311 has a hole to which the insertion guide is inserted. Then, when the HDD tray 410 is inserted to the HDD holder 420, the connector board 450 is movable in the X-Z plane so that the central axis of the insertion guide and the central axis of the hole of the HDD connector 311 are aligned.

In this case, even though the central axis of the HDD connector 311 and of the connector 451 of the connector board are deviated in the plane perpendicular to the Y-axis direction, the HDD connector 311 and the connector 451 may correctly be engaged. There is no need of providing, in the HDD tray, a connector to electrically connect the HDD connector 311 and the connector 451, and therefore the number of components, such as connectors, cables, and the like may be reduced compared to the conventional products, thereby achieving low-cost production.

Figure 31A:
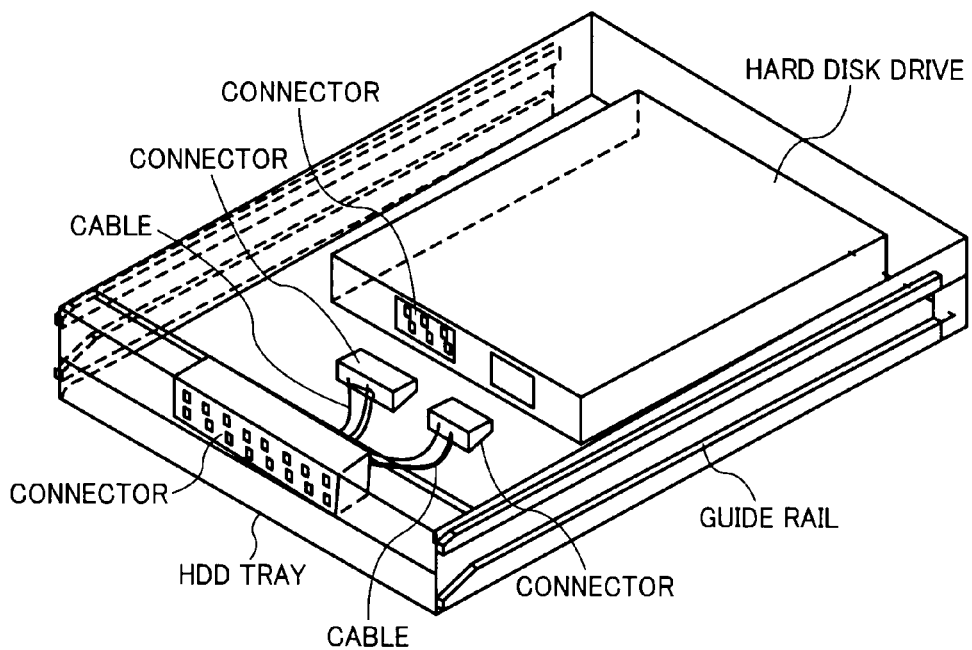
FIG. 31A is a view illustrating a conventional HDD tray.
Figure 31B:
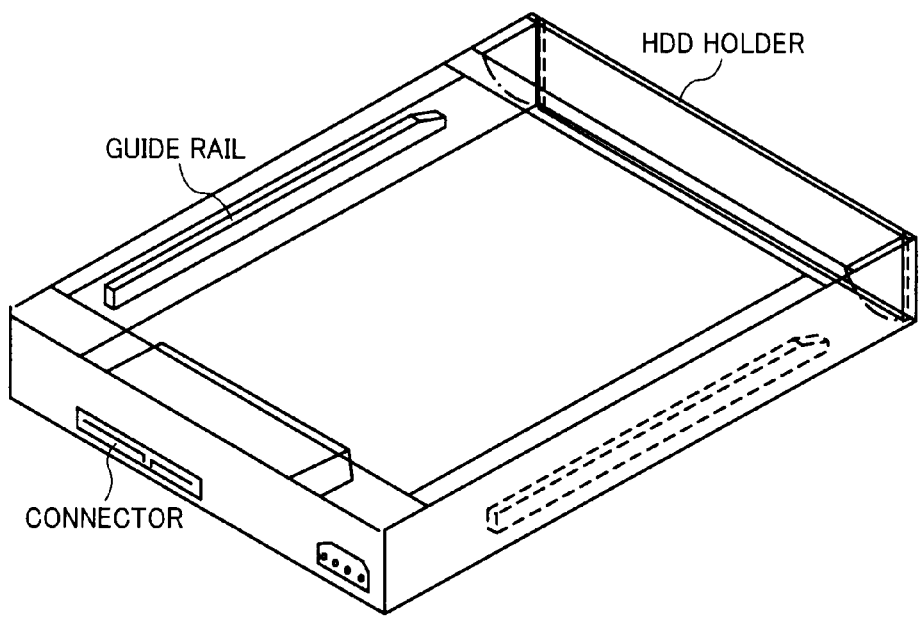
FIG. 31B is a view illustrating a conventional HDD holder.

In the conventional HDD mounting adapter, as illustrated in FIGS. 31A and 31B, a plurality of connectors and cables to be connected with the connectors of the hard disk drive and of the HDD holder were provided to the HDD tray. By contrast, in the present embodiment, without increasing cost, the attachment/detachment of the hard disk drive may be performed easily.

Figure 32A:
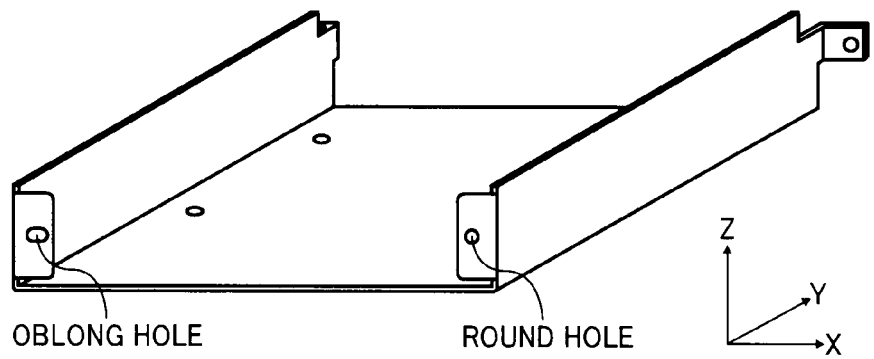
FIGS. 32A and 32B each are views illustrating a hole to which a guide pin in the conventional HDD tray is inserted.
Figure 32B:
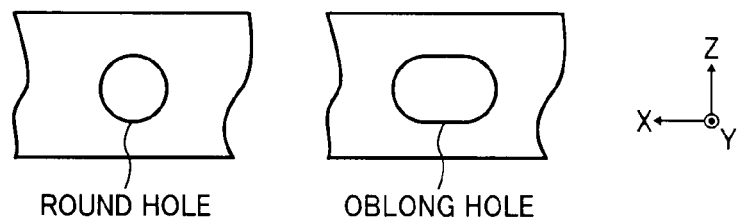
Figure 33:
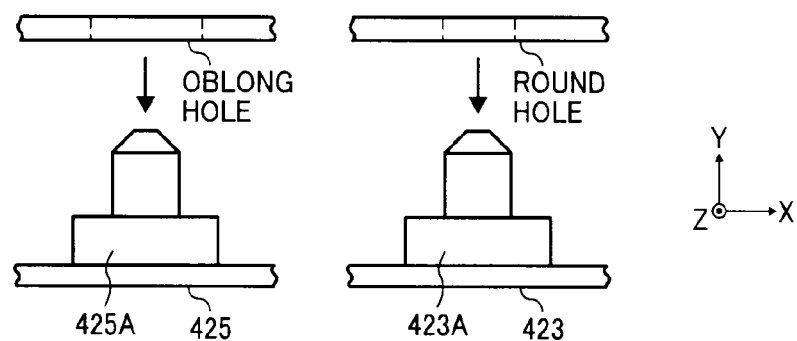
FIG. 33 is a view illustrating relative positions of a round hole and a slot and a guide pin in the conventional HDD tray.

In addition, in the present embodiment, the leading edge of the guide pin is tapered, and the hole of the HDD tray being the counterpart of the guide pin is countersunk. In this case, a guiding function is added and the force necessary to insert the HDD tray into the HDD holder may be reduced. As illustrated in FIGS. 32A, 32B, and 33, the conventional HDD tray had an oblong hole or slot and a round hole corresponding to the guide pins.

Figure 34A:
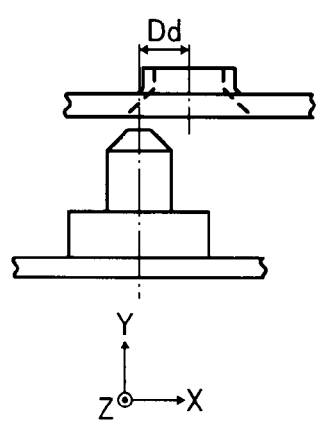
FIGS. 34A and 34B each are views illustrating the difference between the countersink and the round hole.
Figure 34B:
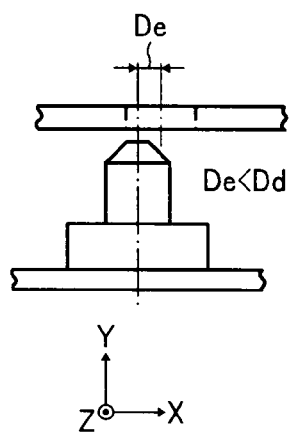

FIG. 34A shows an allowable limit Dd of the deviation in the X-axis direction between the central axis of the hole when the hole of the HDD tray is a countersink, and the central axis of the guide pin. FIG. 34B shows an allowable limit De of the deviation in the X-axis direction between the central axis of the hole when the hole of the HDD tray is a round hole, and the central axis of the guide pin. The relation De<Dd stands. That is, the countersink makes it possible to match the central axis by the guide surface of each other when the deviation amount is smaller than Dd, even though, at a time of insertion, the central axis of the guide pin and the central axis of the counterpart hole are deviated in either direction in the X-Z plane.

In addition, when the holes of the HDD tray are formed of a round hole and a slot, a clearance of the slot can be set to only one direction. Consequently, when the positional deviation between the hole and the guide pin occurs in the clearance non-set direction, the end surface of the slot interferes with the guide pin at a time of insertion of the HDD tray. If the hole diameter is enlarged to avoid interference, the wobbliness becomes large, and the HDD tray cannot be held firmly in place after insertion.

Figure 35A:
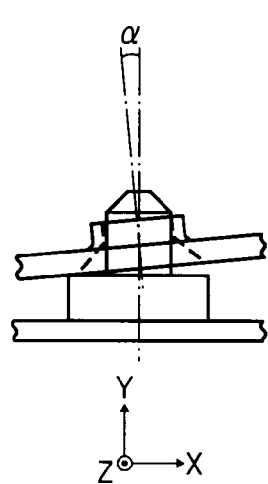
FIGS. 35A and 35B each are views illustrating a difference between a case where the raised portion is provided and a case where a raise portion is not provided.
Figure 35B:
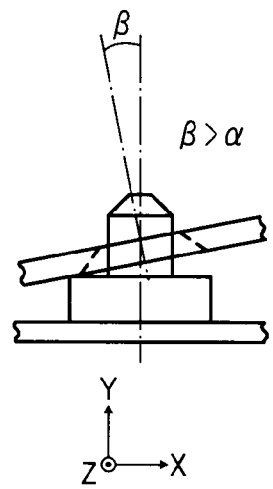

In the present embodiment, the countersink of the HDD tray is provided with a raised portion. By providing this raised portion, the contact area between the guide pin and the hole increases, the holding function of the guide pin is added, and the HDD tray can be firmly held to the HDD holder with only two screws. FIG. 35A shows an allowable slant angle limit α of the HDD tray when the raised portion is provided to the countersink of the HDD tray. FIG. 35B shows an allowable slant angle limit β when the raised portion is not provided to the countersink of the HDD tray. Here, an inequality α<β stands. Thus, it can be noted that the slant of the HDD tray can be suppressed by providing a raised portion. Specifically, even though the guide pin is slanted relative to the countersink of the HDD tray, the straight portion of the raised portion internally contacting the guide pin reduces the oscillation angle, thereby ensuring to hold the HDD tray.

In the above embodiment, a description is given of a case in which the HDD holder 420 includes two stages, but the HDD holder 420 is not limited thereto. In addition, in the above embodiment, a case in which a hard disk drive is mounted to either of the upper and lower stages of the HDD holder 420 is described. However, the present invention is not limited thereto. For example, an optical disc drive, a flexible disc drive, or an MO drive may be mounted to at least one of the stages.

Figure 36:
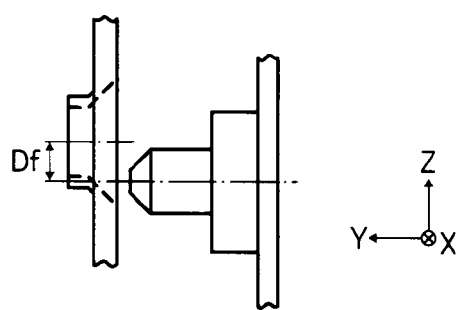
FIG. 36 is a view illustrating a means to press the HDD tray against the guide rail.

Further, in the above embodiment, as illustrated in FIG. 36, the central axis of the guide pin may be offset by an amount Df (i.e., 0.3 mm), for example, toward the −Z direction relative to the central axis of the countersink of the HDD tray. In this case, the HDD tray is inserted to the HDD holder 420 and screwed to the HDD holder 420, the HDD tray is pressed against the guide rail, thereby ensuring added hold on the HDD tray.

Figure 37A:
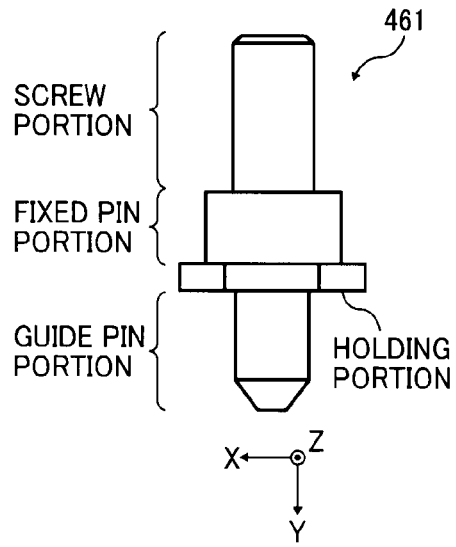
FIGS. 37A and 37B each are views illustrating integrity of a fixed pin and a guide pin.
Figure 37B:
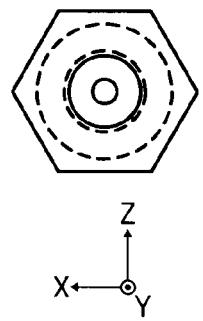

In the above-configured embodiment, as illustrated in FIGS. 37A and 37B, the fixed pin and the guide pin may be integrally formed. The thus-formed integral pin 461 mainly includes three portions, a guide pin portion in the +Y side, a fixed pin portion in a central part, and a screw portion in the −Y side. Between the guide pin portion and the fixed pin portion, there is provided a hexagon-shaped holding portion to rotate the integral pin 461 about its center around a rotation axis parallel to the Y-axis. In this case, the number of pins can be reduced, thereby reducing the cost to manufacture the target product.

Figure 38:
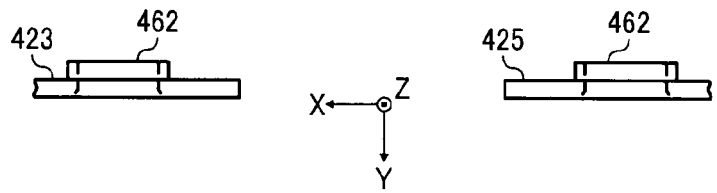
FIG. 38 is a view illustrating a female screw of the HDD holder when an integrally formed pin is used.

As illustrated in FIG. 38, the through hole in the side plate 423 and the side plate 425 where the fixed pin is embedded is implemented with sheet metal burring processing and is provided with a rising portion 462 for a screw with which the screw portion of the integral pin 461 is screwed together.

Figure 39:
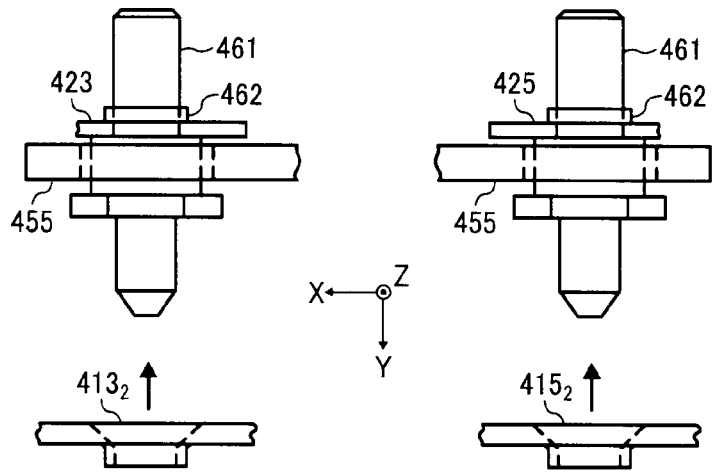
FIG. 39 is a view illustrating holding of a connector board when an integrally formed pin is used.

When mounting the connector board to the HDD holder 420, the screw portion of the integral pin 461 is inserted into the through hole of the circuit board 455 in the connector board, and is screwed together with the rising portion 462 of the side plate (see FIG. 39).

Figure 40:
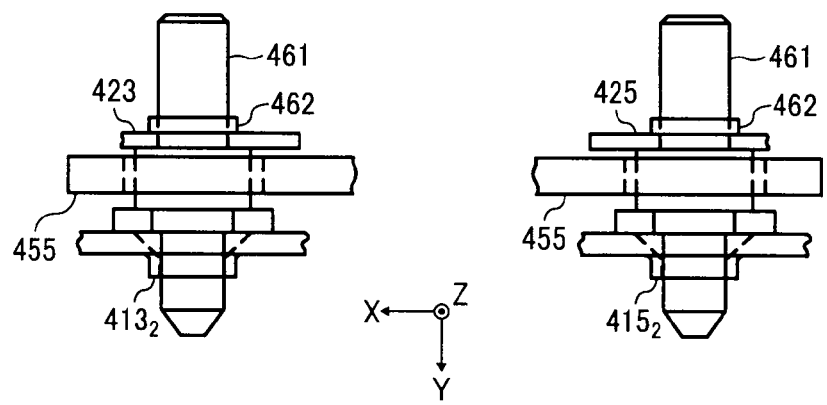
FIG. 40 is a view illustrating a relation between the integrally formed pin and the countersink.

In this case also, the relation between the guide pin portion and the countersink of the HDD tray is identical to the relation between the guide pin and the countersink of the HDD tray in the aforementioned embodiment (see FIG. 40), and the same effect may be attained.

Figure 41:
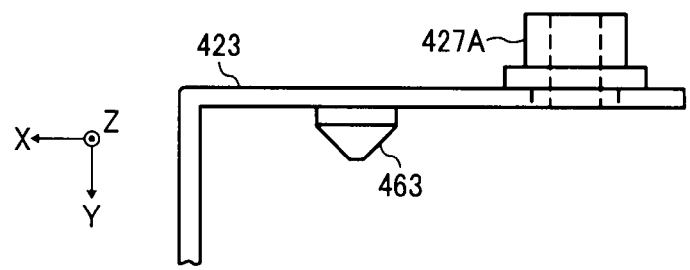
FIG. 41 is a view illustrating a guide pin formed by press processing.
Figure 42:
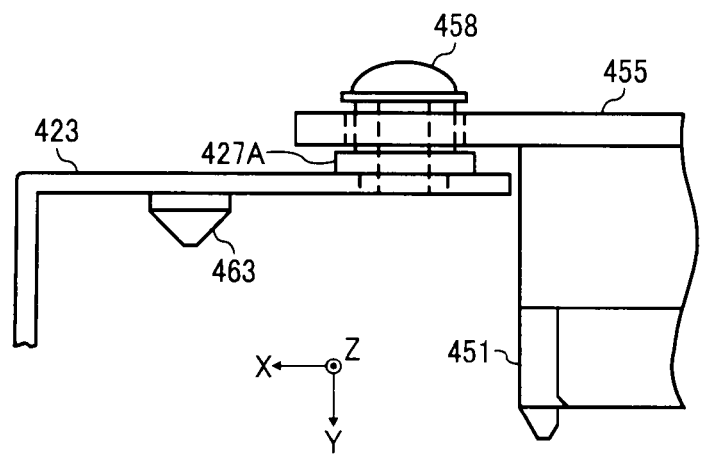
FIG. 42 is a view illustrating holding of a guide pin when the guide pin of FIG. 41 is used.

In the above embodiment, a case in which the guide pin and the side plate of the HDD holder 420 are separately produced is described. As illustrated in FIG. 41, the side plate may be pressed to produce the guide pin 463, and in this case, the connector board may be mounted to the −Y side of the side plate as illustrated in FIG. 42. Furthermore, the position of the mounting hole to mount the hard disk drive in the HDD tray may be shifted.

The guide pin may be held either by the raised portion of the countersink or the countersunk surface.

Figure 43A:
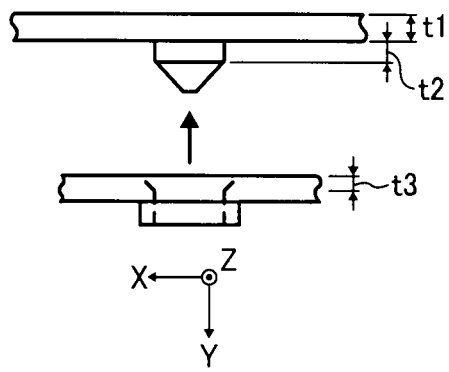
FIGS. 43A and 43B each are first views illustrating a relation between the countersink and the guide pin of FIG. 41.
Figure 43B:
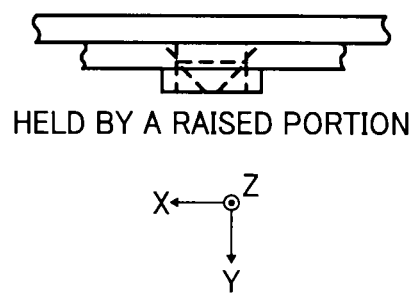

A: Case in which the guide pin is held by the raised portion (see FIGS. 43A and 43B)

When the side plate of the HDD holder 420 is cold-roll sheet steel having a thickness of t1=1.0 mm, the straight height t2 of the guide pin moldable by the general press processing becomes 0.8 mm. Therefore, when the depth t3 of the countersink is set to be 0.4 mm, the guide pin may be held by the raised portion.

Figure 44A:
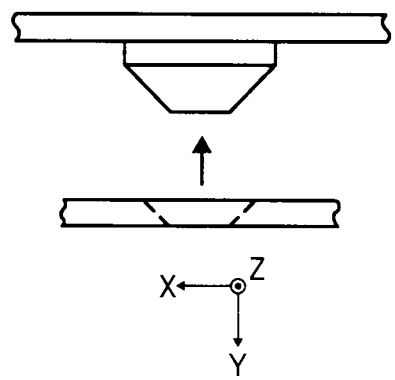
FIGS. 44A and 44B each are second views illustrating a relation between the countersink and the guide pin of FIG. 41.
Figure 44B:
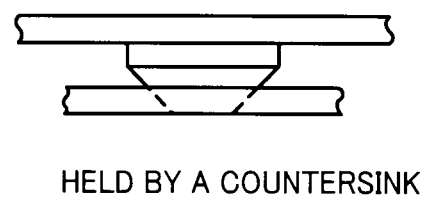

B: Case in which the guide pin is held by the countersunk surface (see FIGS. 44A and 44B)

If the processing precision of the HDD holder 420 and the HDD tray is low, and the deviation between the central axis of the guide pin and the central axis of the countersink becomes greater than 0.4 mm which is the depth of the countersink, the following items may only be adjusted.

(a) the raised portion of the countersink of the HDD tray is removed and the diameter of the countersink is enlarged to 1.0 mm from 0.4 mm.

(b) the size of the taper shape of the guide pin is adjusted to engage the countersunk surface of the countersink.

Figure 45A:
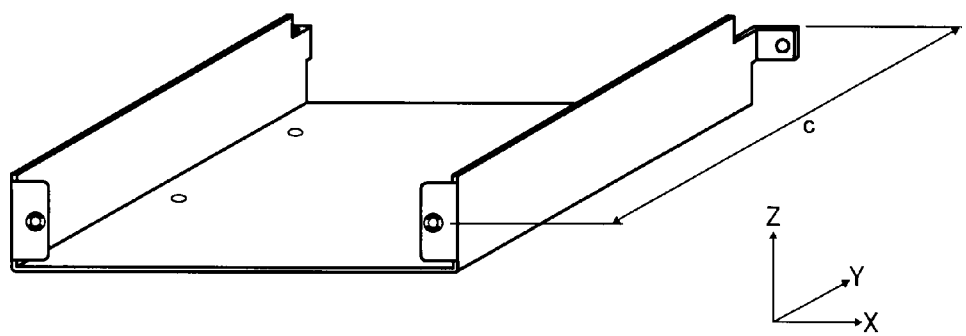
FIG. 45A is a view illustrating a length "c"
Figure 45B:
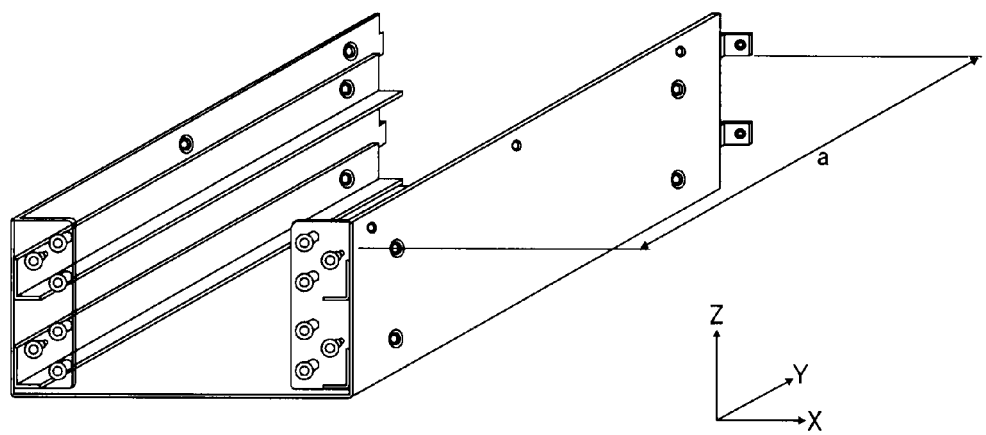
FIG. 45B is a view illustrating a length "a".

(c) where a length (see FIG. 45A) from the screw mounting surface to the countersink in the HDD tray in the Y-axis direction is "c" and a length of the HDD holder 420 (see FIG. 45B) is "a", c=a+0.5 mm. When the HDD tray is screwed together with the HDD holder 420, the countersunk surface is caused to be pressed against the taper portion of the guide pin.

Although the information processing apparatus has been described as having a tower-like housing in the aforementioned embodiments, the housing of the present invention is not limited thereto.

As described above, the mounting adapter in the present invention is suitable to produce a low-cost product. Also, the information processing apparatus of the present invention is suitable for a low cost production.

Additional modifications and variations of the present invention are possible in light of the above teachings. It is therefore to be understood that, within the scope of the appended claims, the invention may be practiced other than as specifically described herein.

What is claimed is:

1. A mounting adapter to mount a device including a connector to a housing of an information processing apparatus, comprising:
   a tray to which the device is fixed;
   a holder, fixed to the housing, to which the tray is inserted from a predetermined direction; and
   a connector board mounted to the holder and provided with a connector with which the connector of the device is connected, the connector board being mounted to the holder so as to be movable in a plane perpendicular to the predetermined direction in which the tray is inserted to the holder,
   wherein the holder comprises a fixed pin to fix the connector board, and the connector board comprises a hole having a diameter sufficiently larger than that of an outer periphery of the fixed pin to permit the movement of the holder in the plane perpendicular to the predetermined direction in which the tray is inserted to the holder.

2. A mounting adapter as claimed in claim 1, wherein
   the connector of the connector board has a tapered insertion guide at one end;
   the connector of the device has a hole into which the insertion guide is inserted; and
   the connector board is movable in the plane perpendicular to the direction in which the tray is inserted to the holder so that a central axis of the insertion guide and a central axis of the hole are aligned.

3. The mounting adapter as claimed in claim 1, wherein a position of the fixed pin in the holder includes an offset corresponding to a difference between a hole diameter of the connector board and an outer periphery of the fixed pin.

4. The mounting adapter as claimed in claim 1, wherein the holder comprises guide pins to define a position of the inserted tray.

5. The mounting adapter as claimed in claim 4, wherein
   a leading edge of the guide pin is tapered; and
   the tray comprises a countersink to which the guide pin is inserted.

6. The mounting adapter as claimed in claim 5, wherein
the holder comprises a guide rail to guide insertion of the
   tray; and
a position of the guide pin in the holder is offset relative to
   the position of the countersink in the tray in a direction to
   press the tray against the guide rail.

7. An information processing apparatus comprising the mounting adapter of claim 1, wherein the device is one of a hard disk drive and an optical disc drive.

* * * * *